United States Patent

Soya et al.

[11] Patent Number: 6,134,604
[45] Date of Patent: *Oct. 17, 2000

[54] COMMUNICATION APPARATUS FOR COMMUNICATING WITH A PLURALITY OF COMMUNICATION CONTROL UNITS CASCADE-CONNECTED

[75] Inventors: Takashi Soya, Ninomiya-machi; Toshiyuki Sekiya, Mishima, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/958,561

[22] Filed: Oct. 27, 1997

[30] Foreign Application Priority Data

Oct. 29, 1996 [JP] Japan ..................................... 8-302344

[51] Int. Cl.$^7$ ....................................................... G06F 3/00
[52] U.S. Cl. ............................... 710/1; 709/222; 709/223; 714/48; 714/819; 340/825.06; 340/286.09
[58] Field of Search .................................. 710/1; 714/48, 714/819; 700/95; 709/222, 223; 340/825.06, 286.09

[56] References Cited

U.S. PATENT DOCUMENTS

| 4,096,566 | 6/1978 | Borie et al. | 364/200 |
| 4,700,292 | 10/1987 | Campanini | 364/200 |
| 5,440,729 | 8/1995 | Kimura et al. | 395/182.07 |
| 5,550,826 | 8/1996 | Tanaka et al. | 370/85.8 |
| 5,689,647 | 11/1997 | Miura | 395/200.15 |

*Primary Examiner*—Ayaz R. Sheikh
*Assistant Examiner*—Rupal D. Dharia
*Attorney, Agent, or Firm*—Fitzpatrick, Cella, Harper & Scinto

[57] ABSTRACT

A communicating apparatus for performing a serial communication with a plurality of communication control units which are cascade connected, including a communicating unit for performing a serial communication with each of the communication control units, a storing unit for storing position data indicative of the order of the communication control units which are cascade connected, and a diagnosing unit for diagnosing a communication abnormal portion on the basis of the position data stored in the storing unit. The diagnosing unit executes a predetermined communication with the communication control unit existing at a position that is closest to the communicating apparatus on the basis of the position data stored in the storing unit and performs a diagnosis on the basis of a result of the predetermined communication. The communicating unit transmits address data to designate the communication control unit to be communicated. The storing unit stores the position data and the address data in correspondence to each other. The communicating unit executes a communication in accordance with the priorities which are made correspond to the address data.

20 Claims, 11 Drawing Sheets

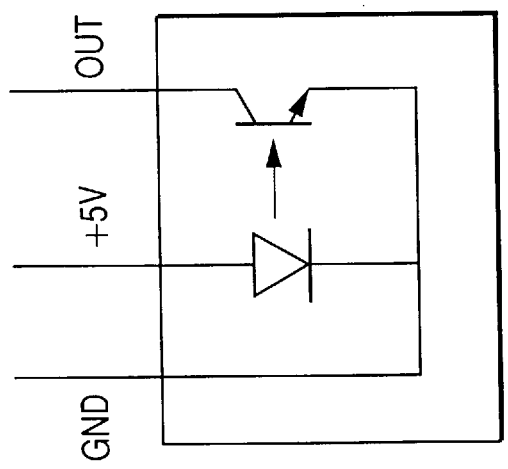
FIG. 2
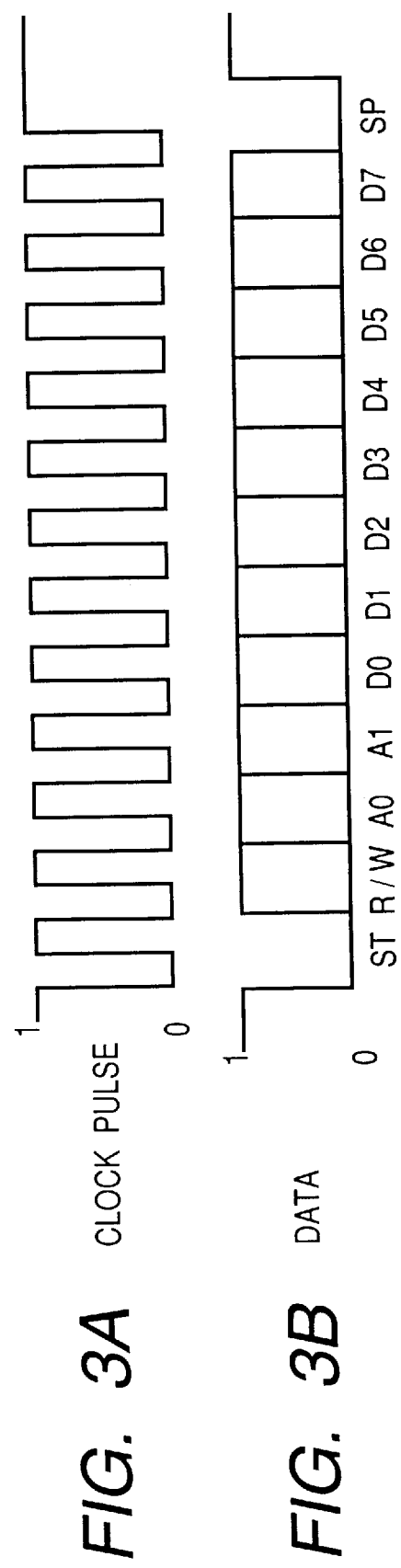
FIG. 3A CLOCK PULSE
FIG. 3B DATA

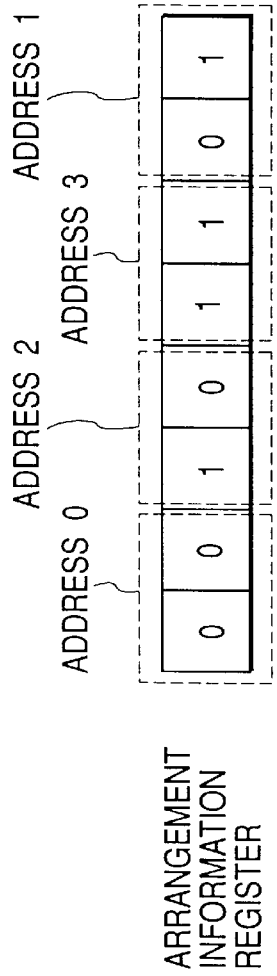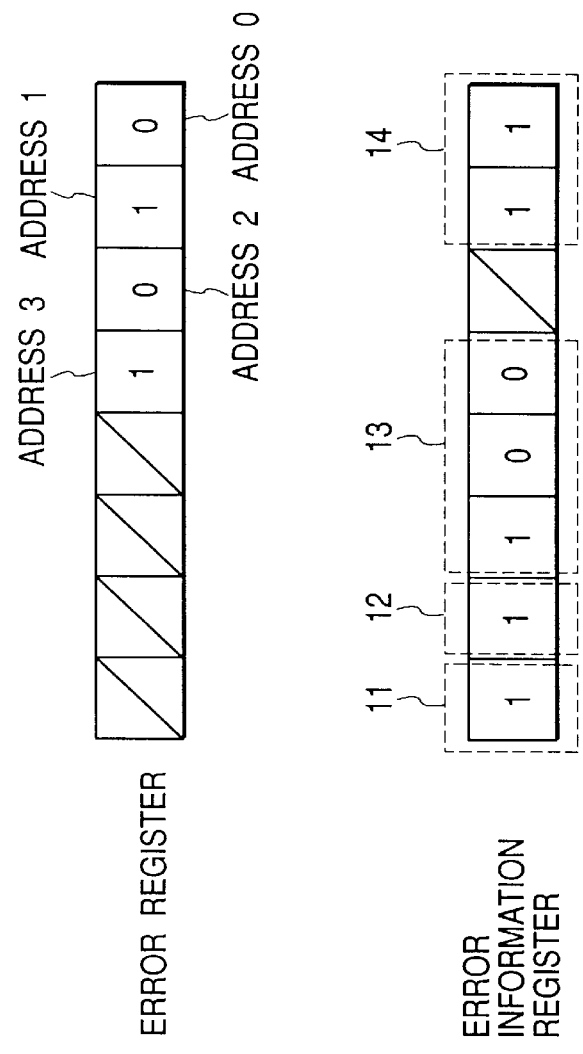
FIG. 7A
FIG. 7B
FIG. 7C

COMMUNICATION APPARATUS FOR COMMUNICATING WITH A PLURALITY OF COMMUNICATION CONTROL UNITS CASCADE-CONNECTED

BACKGROUND OF THE INVENTION

1. Field of the Invention

The invention relates to a communicating apparatus for communicating with a plurality of communication control units which are cascade connected.

2. Related Background Art

Hitherto, a serial communication system has been proposed as means for allowing two microprocessors having a plurality of management targets to mutually exchange internal data possessed with respect to own items which are managed by the microprocessor itself.

As such a kind of serial communication system, there has been known a system such that one of microprocessors time-sequentially transmits binary data in accordance with a predetermined procedure onto one or two data lines which are mutually connected for transmission and reception, while the other microprocessor time-sequentially receives the binary data and executes a predetermined arithmetic operating process as necessary by an internal program and an arithmetic operation result is stored into a memory.

However, at present, a serial communication system of a format shown in FIG. 9 has also been proposed. According to the serial communication system, a communication controller 101, a communication IC 103 to which a plurality of sensors 102, ... are connected, and a communication IC 106 to which a motor driver 105 to drive a motor 104 is connected are cascade-connected through one signal line composed of total four lines of +5V serving as a power supplying line, a GND, a sync clock line, and a data line for serial communication.

In case of providing such a serial communication system into an image forming device such as a copying apparatus or the like and using it, as shown in FIG. 10, the communication controller 101 connected to a control unit of the image forming device and a number of communication ICs 108 to 111 to which sensors 112 to 115 arranged at proper positions in the device are connected through one signal line, thereby performing a transmission/reception communication between the communication controller 101 and each of the communication ICs 108 to 111. In this case, by designating peculiar addresses (address 0, address 1, address 2, ... ) to the communication ICs irrespective of the arranging positions of the communication ICs 108 to 111 in the device, the transmission/reception communication is executed between each of the communication ICs 108 to 111 of each address and the communication controller 101. As mentioned above, since the data communication is executed by performing the address designation by the serial communication, when communications with a plurality of addresses are simultaneously requested, a delay occurs in the data communication. On the other hand, in a communication in the image forming device, a portion where a delay of the data communication must not be caused and a portion where the data communication may be delayed exists. Therefore, by raising priorities of communications in accordance with the order from the small communication address (for instance, address 0 is set to the highest priority and the priorities are sequentially allocated in accordance with the order of address 1, address 2, ... ) and by connecting those communication ICs 108 to 111 to the communication controller 101, the communication IC (in this case, the communication IC 108) in which the delay is not permitted mostly is designated to the highest priority and the communication is executed.

In such a serial communication system, by sequentially checking an abnormality of the communication ICs in accordance with the order from the small address number on the basis of a flowchart shown in FIG. 11, a disconnection of the signal line, a failure of the communication IC, or the like, namely, a disconnected portion or a failed portion is detected.

In other words, first in step S51, the number (M) of connection addresses (for example, 4) is set. In step S52, an address number (n) is set to "0". In step S53, the communication controller 101 transmits abnormality diagnosis check data to the communication IC 108 of address 0 synchronously with a clock pulse train. In step S54, the abnormality diagnosis check data is returned from the communication IC 108. The communication controller 101 receives the data and writes its contents into an internal register. In step S55, a check is made to see if the reception data stored in the internal register of the communication IC 108 and the transmission data from the communication controller 101 are the same. When they are equal, it is determined that an abnormality such as disconnection or the like doesn't occur between the communication controller 101 and the communication IC 108 of address 0. Step S56 follows and a check is made to see whether the address number (n) is equal to or larger than (M–1) or not. If NO, namely, when the address number (n) is smaller than (M–1), the address (n) is increased by only "1" (step S57). The processing routine is returned to step S53 and an abnormality diagnosis check similar to that mentioned above is subsequently executed with respect to address 1. If YES in step S56, namely, when it is decided that an abnormality such as disconnection or the like doesn't occur between all of the communication ICs 108 to 111 and the communication controller 101, step S58 follows. The end of abnormality diagnosis check is notified and the processes are finished.

For example, as shown in FIG. 10, when an abnormality such as disconnection or the like occurs between the communication IC 109 of address 1 and the communication IC 110 of address 2, although the communication controller 101 has transmitted the abnormality diagnosis check data to the communication IC 110 of address 2 in step S53, the communication controller 101 cannot receive the abnormality diagnosis check data which is returned from the communication IC 110. Therefore, the transmission data from the communication controller 101 and the storage data (reception data) stored in the internal register of the communication controller 101 are different. In this case, consequently, the answer in step S55 in FIG. 11 is NO. Step S59 follows and an error flag is made active, thereby showing the occurrence of an error. In step S60, a disconnected address (in this case, address 2) in which a failure such as disconnection or the like occurred is notified. The end of check is notified in step S58 and the processes are finished. In this case, as for an abnormality diagnosis of the communication IC 111 of address 3, the presence or absence of the abnormality can be discriminated by correcting the abnormality of the communication IC 109 of address 2 and again executing the foregoing abnormality diagnosis after that.

By executing such an abnormality diagnosis, not only the disconnection of the signal line but also the location of the disconnection or the failed communication IC can be easily and promptly known. An erroneous connection at the time of assembly of the system can be avoided. A countermeasure for repair in case of disconnection can be promptly taken.

In the above conventional technique, the communication ICs 108 to 111 and the communication controller 101 are sequentially connected in accordance with the order from the small address. However, in case of actually assembling them into the apparatus, the communication IC having a high priority is not always arranged on this side. As shown in FIG. 12, for instance, there is also a case where the communication ICs are connected to the communication controller 101 in accordance with the order of address 1, address 2, address 0, and address 3.

In the conventional abnormality diagnosing method, however, as shown in FIG. 12, even in the case where the communication controller 101 and the communication ICs 108 to 111 are cascade connected, the abnormality diagnoses are sequentially performed in accordance with the order from the small address number. Therefore, when an abnormality occurs between the communication controller 101 and the communication IC 108 of address 0, the abnormality diagnosing program is finished at a time point when the abnormality is detected with respect to the communication IC 108 and the abnormality diagnoses are not executed for the communication ICs 109 to 111. That is, in this case, although the occurrence of the abnormality between the communication IC 108 of address 0 and the communication controller 101 can be promptly detected, since the communication IC 109 of address 1 and the communication IC 110 of address 2 exist between the communication controller 101 and the communication IC 108 of address 0, it is impossible to determine in which one of the three communication ICs 108 to 110 a cause of the occurrence of the abnormality exists or at which position on the signal line connected to the communication controller 101 the disconnection or the like occurred. That is, the conventional method of sequentially performing the abnormality diagnoses in accordance with the order from the small address has problems such that the position where the abnormality occurred cannot be specified in dependence on a connecting situation of each of the communication ICs 108 to 111 to the communication controller 101 and a countermeasure cannot be promptly taken for the occurrence of the abnormality.

SUMMARY OF THE INVENTION

It is an object of the invention to provide a communicating apparatus which can solve the foregoing problems.

Another object of the invention is to provide a communicating apparatus which can diagnose a plurality of communication control units of communication abnormality locations which are cascade connected.

Still another object of the invention is to provide a communicating apparatus which can arrange connecting positions of communication control units irrespective of the order of addresses of the communication control units.

The above and other objects and features of the present invention will become apparent from the following detailed description and the appended claims with reference to the accompanying drawings.

BRIEF DESCRIPTION OF THE DRAWINGS

FIG. 2 is an internal constructional diagram of a sensor in FIG. 1;

FIGS. 3A and 3B are time charts for explaining the operation of a serial communication in a normal state;

FIGS. 7A, 7B and 7C are data format diagrams of an arrangement information register, an error register, and an error information register which are built in the communication controller according to the second embodiment of the invention;

DETAILED DESCRIPTION OF THE PREFERRED EMBODIMENTS

Embodiments of the present invention will now be described in detail hereinbelow with reference to the drawings.

Figure 1:
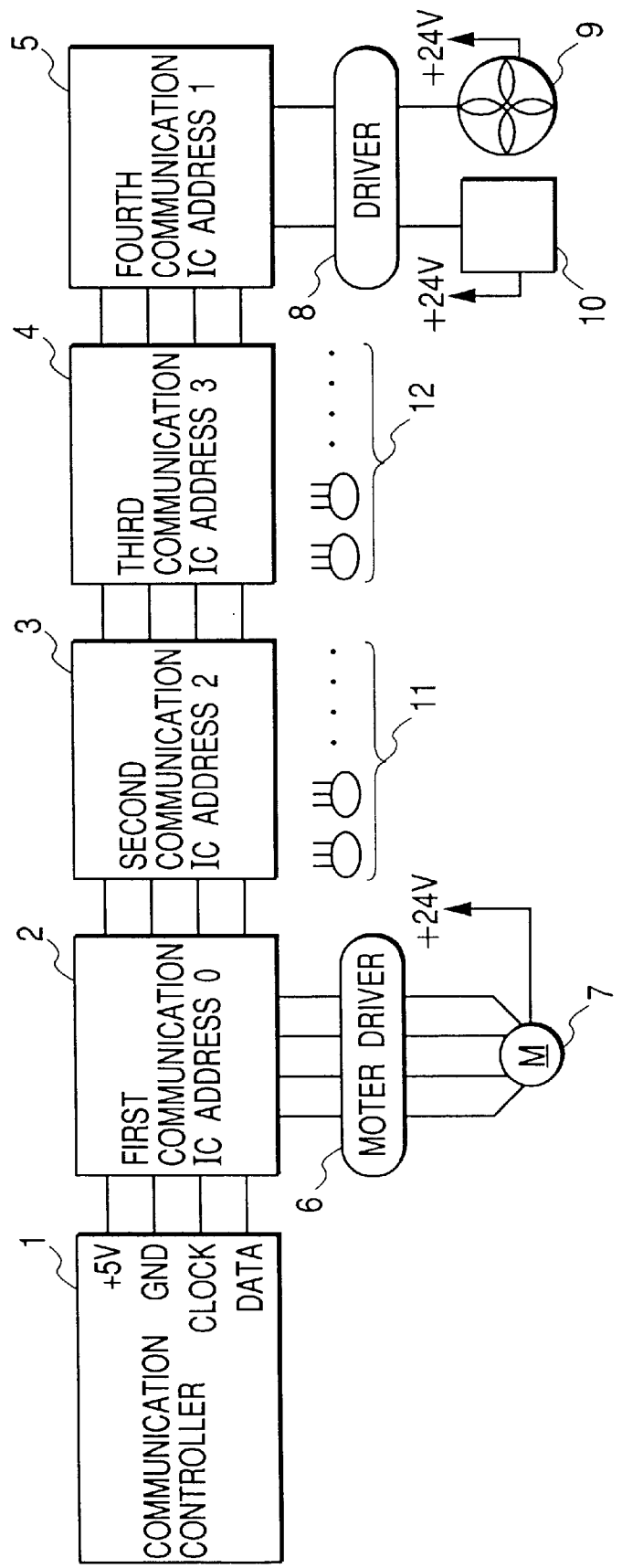
FIG. 1 is a system constructional diagram showing an embodiment of a serial communication system as a communication system according to the invention.

FIG. 1 is a block constructional diagram showing an embodiment of a serial communication system serving as a communication system according to the invention. According to the serial communication system, a communication controller 1 having various registers such as arrangement information register, error register, and the like, a first communication IC 2 of address 0, a second communication IC 3 of address 2, a third communication IC 4 of address 3, and a fourth communication IC 5 of address 1 are cascade connected through total four signal lines of +5V serving as a power supply line, a GND, a sync clock line, and a data line for serial communication, respectively.

A motor driver 6 to drive a stepping motor 7 of four phases is connected to the first communication IC 2.

A power driver 8 to drive a fan 9 and a solenoid 10 is connected to the fourth communication IC 5.

Further, a plurality of sensors 11 . . . and 12 . . . of proper numbers arranged at predetermined positions of, for example, an image forming device (not shown) are connected to the second and third communication ICs 3 and 4, respectively.

As shown in FIG. 2, specifically, the sensors 11 . . . and 12 . . . are made up of sensors of the photo interrupter type such as photocouplers or the like and are connected to the second and third communication ICs 3 and 4 through three signal lines of +5V serving as a power supply line, a GND, and a binary data line, respectively.

In the serial communication system with the above construction, transmission data from the communication controller 1 is buffered, a control signal for a load such as a motor driver 6 or the like is generated, and individual information of input loads of the sensors 11 . . . , 12 . . . , and the like is time-sequentially transmitted to the communication controller 1.

Specifically speaking, outputs of the sensors 11 . . . and 12 . . . are always inputted as binary data to the second and third communication ICs 3 and 4, respectively. In case of performing transmission and reception between the communication controller 1 and each of the communication ICs 2 to 5, as shown in FIG. 3A, the communication controller 1 transmits a pulse train of a predetermined frequency to the clock line and executes each process between the communication controller 1 and each of the communication ICs 2 to 5 synchronously with the pulse train at a timing shown in FIG. 3B. The clock signal line and the data signal line in a non-communication state are held to "1" (H1).

That is, each of the communication ICs 2 to 5 recognizes the communication start in response to a first trailing edge of the clock pulse and checks to see if a start bit (ST: "0") has been transmitted to the data line by the communication controller 1 in response to a leading edge of the next clock pulse.

Whether the communication controller 1 transmits (writes) data (D0 to D7) of eight bits to each of the communication ICs 2 to 5 or the communication controller 1 receives (reads) the data (D0 to D7) of eight bits from each of the communication ICs 2 to 5 via the data line in response to the leading edge of the next clock pulse is designated (R/W).

The data at the time of the leading edge of the next clock pulse indicates the address designation from the communication controller 1 (A0, A1). Any one of the communication ICs 2 to 5 is designated by the address.

When recognizing that the address of the self communication IC has been designated, each of the communication ICs 2 to 5 sequentially writes the data (D0 to D7) of total eight bits from the leading edge of the next clock pulse into the register in the communication IC when the transmission is designated. When the reception is designated, each communication IC sequentially transmits the data onto the data line. In case of the transmission, the data is outputted to each bit as binary data for the load such as a motor driver 6 or the like. On the other hand, in case of the reception, each bit is received and outputted while using the binary output data from the sensors 11 . . . and 12 . . . as information. The communication controller 1 fetches the 8-bit data and stores into a predetermined address in an internal memory.

After the 8-bit data was fetched, the communication controller 1 confirms that the transmission as a stop bit (SP: "0") has been transmitted from each of the communication ICs 2 to 5 in response to the leading edge of the next clock pulse.

In the above serial communication system, the information of a proper number of binary sensors arranged at predetermined positions in the apparatus can be fetched by one of the four signal lines which are cascade connected or the load such as a motor driver or the like can be controlled by a number of binary signals. The control unit of the image forming device can also fetch the data as mentioned above only when it is necessary and can construct a routine such that the data of the addresses is sequentially fetched at every predetermined time by a timing circuit constructed by an internal timer interrupting circuit and hardware and can also refer to the data accumulated in desired reception data at an arbitrary timing.

The priorities of the communication are set such that address 0 has the highest priority and they sequentially decrease in accordance with the order of address 1, address 2, and address 3. For example, when the communication controller 1 almost simultaneously receives a communicating command with address 0 and a communicating command with address 1 by the image forming device control unit, the communication controller 1 preferentially performs the communication with address 0. Therefore, in the embodiment, even if the first communication IC 2 is connected to which unit, the control of the motor 7 can be executed without a delay.

Figure 4:
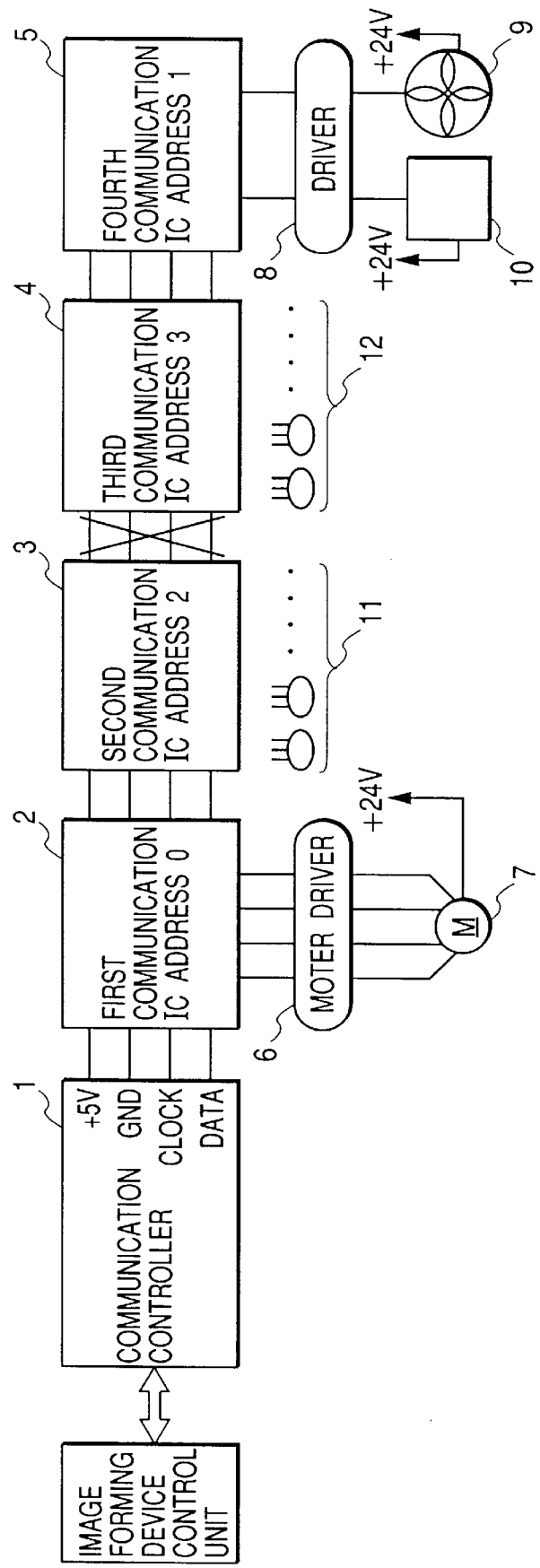
FIG. 4 is a system constructional diagram showing a state in the case where a part of the serial communication system is disconnected.

In the serial communication system, as shown in FIG. 4, an abnormality diagnosing method in the case where a disconnection accident occurs between the second communication IC 3 and the third communication IC 4 will now be described in detail.

Figure 5A:
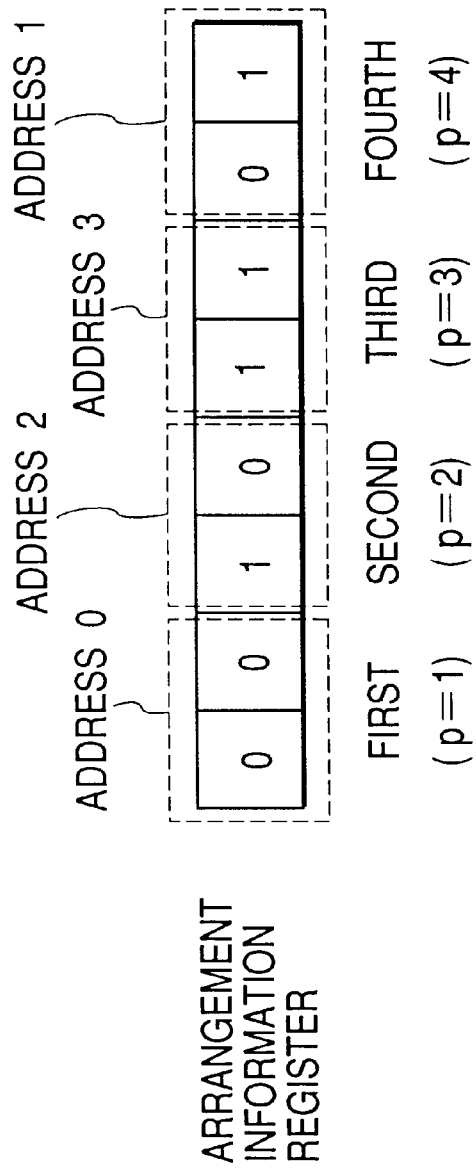
FIGS. 5A and 5B are data format diagrams of an arrangement information register and an error information register which are built in a communication controller.
Figure 5B:
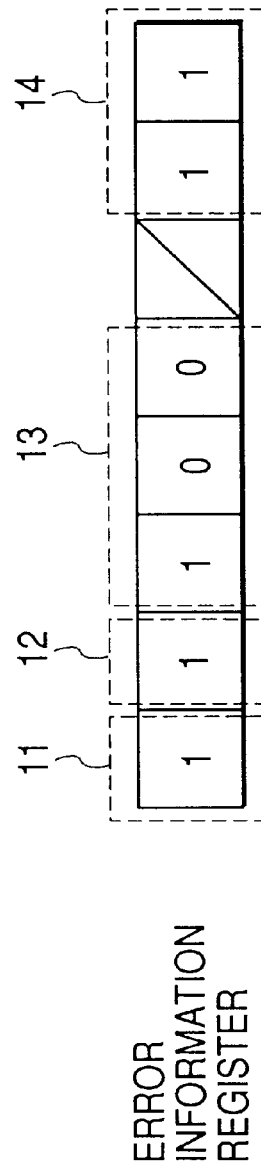

FIGS. 5A and 5B are data format diagrams of an arrangement information register and an error information register built in the communication controller 1, respectively.

The arrangement information register is a register to store arrangement information (p) of each of the communication ICs 2 to 5 for the communication controller 1. The address numbers (address 0, address 2, address 3, address 1) have been stored as binary data in the register in accordance with the order from the position near the communication controller 1, namely, the order of the first to fourth communication ICs 2 to 5.

The error information register has a check end bit writing area 11, an error discrimination bit writing area 12, a connection address number bit writing area 13, and an error address bit writing area 14.

The check end bit writing area 11 is set to "0" during the execution of the abnormality diagnosis and is rewritten to "1" in response to the end of the abnormality diagnosis. The error discrimination bit writing area 12 is set to "0" when no error occurs and is rewritten to "1" by the occurrence of the error. Further, the number of communication ICs connected to the communication controller 1 has been written as binary data in the connection address number bit writing area 13. The error address bit writing area 14 is an area to write the bit of address in which an error occurred.

Figure 6:
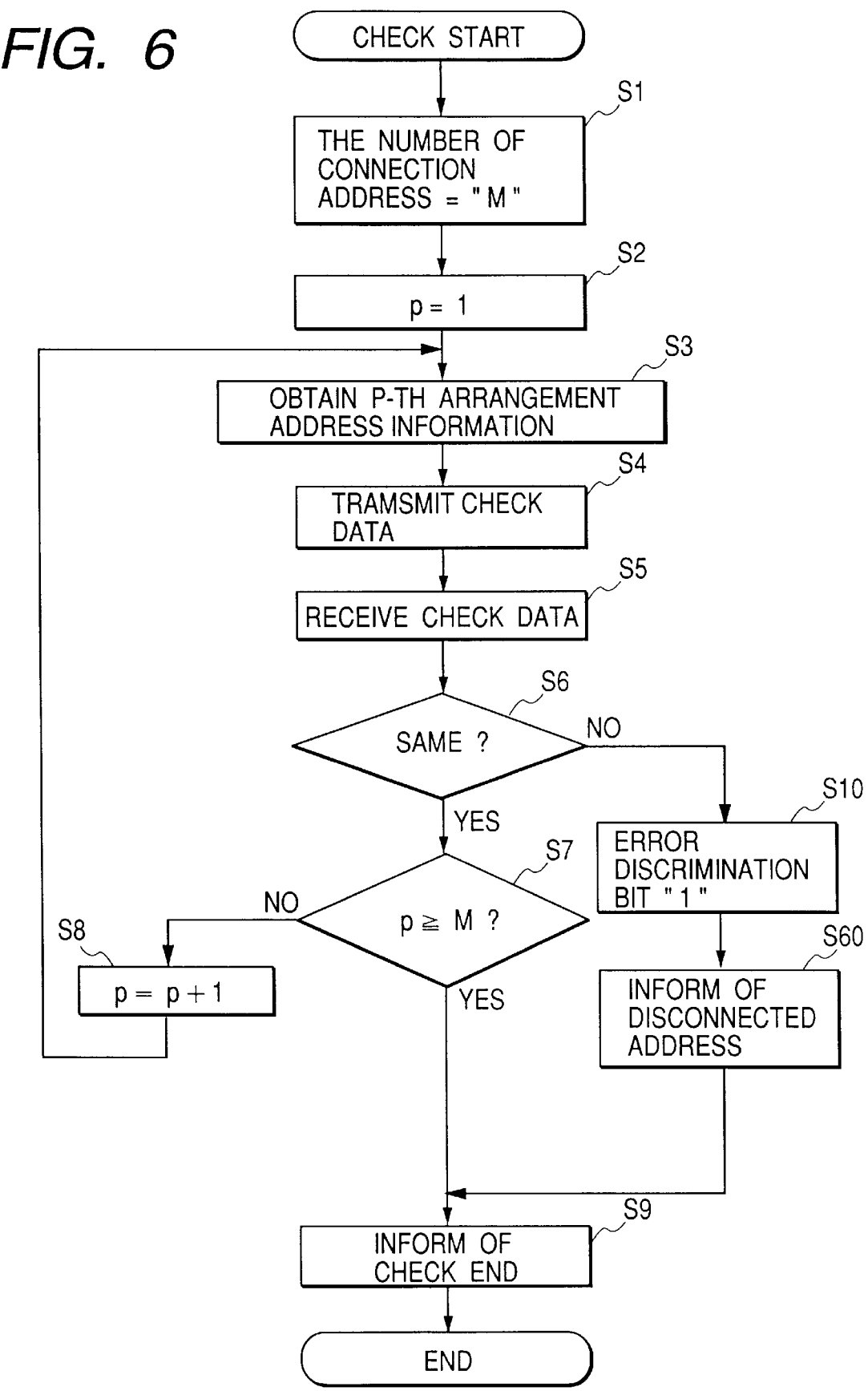
FIG. 6 is a flowchart showing the first embodiment of an abnormality diagnosing method of the invention.

FIG. 6 is a flowchart (first embodiment) showing the abnormality diagnosing method of the invention.

In step S1, the number (M) of connection addresses (the number of communication ICs: "4" in the embodiment) is set. In step S2, the arrangement information (p) is set to "1". In step S3, the p-th (p=1) address information, namely, address 0 is obtained with reference to the arrangement information register. Thus, the abnormality diagnosis is executed with respect to the first communication IC 2 of address 0. That is, the communication controller 1 transmits predetermined abnormality diagnosis check data to the first communication IC 2 synchronously with a clock pulse train (step S4). Subsequently, the abnormality diagnosis check data from the first communication IC 2 is received and written into the internal register of the communication controller 1 (step S5). In step S6, a check is made to see if the transmission data and the reception data written in the internal register are equal. If YES, step S7 follows and a check is made to see whether the arrangement information (p) is equal to or larger than the number (M) of connection addresses or not. In this case, since p=1 and M=4, the answer in step S7 is NO and step S8 follows. The arrangement information (p) is increased by only "1". The processing routine is returned to step S3 and the abnormality diagnosis of the second communication IC 3 is executed in a manner similar to the above. When the answer is YES in step S6 for all of the communication ICs, the answer in step S7 is also YES. It is determined that no abnormality occurs in the communication system. Step S9 follows and the data in the check end bit area 11 (FIG. 5B) is rewritten to "1" and the end of check is notified. The processes are finished.

On the other hand, when an abnormality such as disconnection or the like occurs between the second communication IC 3 and the third communication IC 4 as shown in FIG. 4, predetermined abnormality diagnosis check data is transmitted from the communication controller 1 to the third communication IC 4. However, since the abnormality diagnosis check data is not returned from the third communication IC 4, the communication controller 1 cannot receive the abnormality diagnosis check data. Therefore, the reception data stored in the internal register of the communication controller 1 and the abnormality diagnosis check data (transmission data) are not the same. The answer in step S6 is NO and the data in the error discrimination bit area 12 is rewritten from "0" to "1". In step S1, the bit data "11" of address 3 of the third communication IC 4 is written into the error address bit area 14 and address 3 of the disconnected third communication IC 4 is notified to the image forming device control unit. After that, step S9 follows and the data in the check end bit area is rewritten to "1" and the end of check is notified. The processes are finished.

According to the embodiment as mentioned above, the abnormal portion in the system can be easily and promptly detected irrespective of the address number of the communication IC.

The second embodiment will now be described.

FIGS. 7A, 7B and 7C are diagrams showing a data format of each of the registers built in the communication controller 1. In the second embodiment, in addition to the above first embodiment, an error register is provided in the communication controller 1.

An error information writing area corresponding to each address is provided for the error register. When no error occurs in the communication IC of each address, "0" is written into the error information writing area corresponding to the relevant address. When an error occurs, "1" is written into the error information writing area corresponding to the relevant address. In the second embodiment, the abnormality diagnoses are sequentially executed in accordance with the order from the small address number of the communication IC, namely, the order of the first communication IC 2, fourth communication IC 5, third communication IC 2, and fourth communication IC 3.

The abnormality diagnosing method will now be described hereinbelow with reference to a flowchart shown in FIG. 8 with respect to a case where a disconnection occurs between the second communication IC 3 and the third communication IC 4 as shown in FIG. 4.

In step S21, the number (M) of connection addresses (for example, 4) is set. In step S22, the address number (n) is set to "0". In step S23, the communication controller 1 transmits the abnormality diagnosis check data from the sync clock line to the first communication IC 2 of address 0 synchronously with the clock pulse train. In step S24, the abnormality diagnosis check data transmitted from the first communication IC 2 is written into the internal register of the communication controller 1. In step S25, a check is made to see if the reception data stored in the internal register of the communication controller 1 and the transmission data sent to the first communication IC 2 are the same. If YES, it is decided that no abnormality occurs between the communication controller 1 and the first communication IC 2. Step S26 follows and "0" is written into the error information writing area of address 0 in the error register.

In step S28, a check is made whether the address number (n) is equal to or larger than (M−1) or not. In this case, since n=0 and (M−1)=3, the answer in step S28 is NO and the address (n) is increased by only "1" (step S29). The processing routine is returned to step S23 and the abnormality diagnosis similar to that mentioned above is executed with respect to address 1. In this case, since the line between the second communication IC 3 and the third communication IC 4 is disconnected, predetermined abnormality diagnosis check data is transmitted from the communication controller 1 to the fourth communication IC 5. However, the communication controller 1 cannot receive the abnormality diagnosis check data from the fourth communication IC 5 and the answer in step S25 is NO. Thus, the program advances to step S27 and "1" is written into the error information writing area of address 1 in the error register and step S28 follows.

In step S28, a check is again made to see whether the address number (n) is equal to or larger than (M−1) or not. In this case, since n=1 and (M−1)=3, the answer in step S28 is again NO. The address (n) is increased by only "1" (step S29). The processing routine is returned to step S23 and an abnormality diagnosis similar to that mentioned above is executed with regard to address 2. In this case, in a manner similar to the case of n=0, the answer in step S25 is YES. The processing routine advances to step S26 and "0" is written into the error information writing area of address 2 in the error register.

In step S28, a check is again made to see whether the address number (n) is equal to or larger than (M−1) or not. In this case, since n=2 and (M−1)=3, the answer in step S28 is again NO and the address (n) is increased by only "1" (step S29). The processing routine is returned to step S23 and a disconnection check similar to that mentioned above is performed with respect to address 3. In this case, the answer in step S25 is NO in a manner similar to the case of n=1. Step S27 follows and "1" is written into the error information writing area of address 3 in the error register.

In step S28, a check is again made to see if the address number (n) is equal to or larger than (M−1) or not. In this case, since n=3 and (M−1)=3, the answer in step S28 is YES and it is decided that the abnormal diagnoses were finished with respect to all of the communication ICs. Step S30 follows.

In step S30, as shown in the following table 1, the storage contents in the error register are collated from the arrangement information (p) in the arrangement information register and the address number (n) of the communication IC.

TABLE 1

| Arrangement information p | Address No. n | Storage contents in error register |
|---|---|---|
| 1 | 0 | 0 |
| 2 | 2 | 0 |
| 3 | 3 | 1 |
| 4 | 1 | 1 |

From Table 1, it will be understood that the storage contents in the error registers of the third communication IC 4 of address 3 and the fourth communication IC 5 of address 1 show the occurrence of errors. However, as shown in FIG. 4, since the third communication IC 4 of address 3 is closer to the communication controller than the fourth communication IC 5 of address 1, address 3 is determined to be an error address.

In step S31, the error discrimination bit area 12 in FIG. 7C is rewritten from "0" to "1". Further, bit data "11" of address 3 of the third communication IC 4 is written into the error address bit area 14 and the address of the disconnected communication IC is notified. In step S32, the data in the check end bit area is rewritten to "1" and the end of check is notified. The processes are finished.

Even in the second embodiment as mentioned above, an abnormal portion in the communication system can be easily and promptly detected.

It will be obviously understood that the invention is not limited to the foregoing embodiments.

In the embodiments, although four communication ICs (four addresses) are arranged for one signal line and desired information is transmitted and received from the communication controller by the serial communication. However, it is also possible to easily change to the optimum construction in dependence on a decision of the data format of communication or the number of registers. For example, now assuming that the number of address bits is set to three bits, the arrangement information register is set to 24 bits, the error register is set to 8 bits, the connection address number bits are set to 4 bits, and the number of error address bits is set to 3 bits, even in case of cascade connecting the communication IC to up to 8 addresses in one signal line, the abnormality diagnosis of the system can be also executed in a manner similar to the above.

What is claimed is:

1. A communicating apparatus for communicating with a plurality of communication control units that are cascade-connected with a signal line, said communicating apparatus comprising:

a diagnosis circuit adapted for diagnosing an abnormality in communication with each of the Plurality of communication control units by sending and receiving test data;

a memory for storing information about a connection order of the plurality of communication control units that are cascade connected;

a control circuit adapted for sequentially switching a communication control unit to be sending/receiving the test data to/from said diagnosis circuit, based on the information stored in the memory;

a discrimination circuit adapted for discriminating an abnormal portion of the signal line, based on a result from said diagnosis circuit; and a notification circuit adapted for providing a notification of the abnormal portion discriminated by said discrimination circuit.

2. An apparatus according to claim 1, wherein said memory stores position data indicative of the order of said plurality of communication control units.

3. An apparatus according to claim 2, wherein said diagnosis circuit performs a predetermined communication with a communication control unit existing at a position that is closest to said communicating apparatus based on the position data stored in said memory, and executes a diagnosis based on a result of the predetermined communication.

4. An apparatus according to claim 3, further comprising a transmitter adapted for transmitting address data to designate a communication control unit to be communicated with, wherein said memory stores the position data and the address data in correspondence to each other.

5. An apparatus according to claim 4, wherein said transmitter performs a communication in accordance with priorities that correspond to the address data.

6. An apparatus according to claim 1, wherein each of the plurality of communication control units is connected to a sensor or a driver.

7. An apparatus according to claim 1, wherein said communicating apparatus is connected to a control unit of an image forming device.

8. An apparatus according to claim 1, further comprising a transmitter adapted for performing a serial communication with the plurality of communication control units.

9. An apparatus according to claim 1, wherein said diagnosis circuit comprises:

a transmitter adapted for transmitting first data to a communication control unit;

a receiver adapted for receiving second data from the communication control unit; and a comparing circuit adapted for comparing the first data with the second data.

10. An image forming device comprising a communicating apparatus according to claim 1.

11. A device according to claim 10, further comprising an image processing control unit for performing a predetermined image processing control, wherein said communicating apparatus is built in said image processing control unit.

12. A device according to claim 10, further comprising an image processing control unit for performing a predetermined image processing control, wherein said communicating apparatus is separately provided independent of said image processing control unit.

13. An abnormality diagnosis method of a communication system for communicating with a plurality of communication control that are cascade-connected with a signal line, said method comprising the steps of:

diagnosing an abnormality in communication with each of the plurality of communication control units by sending and receiving test data;

storing in a memory information about a connection order of the plurality of communicating control units that are cascade connected;

sequentially switching a communication control unit to be sending/receiving the test data for diagnosis, based on information stored in the memory;

discriminating an abnormal portion of the signal line, based on a result from said diagnosing step;

providing a notification of the abnormal portion discriminated in said discriminating step.

14. A method according to claim 13, wherein said diagnosing step comprises:

a transmitting step of transmitting first data to a communication control unit;

a receiving step of receiving second data from the communication control unit; and a comparing step of comparing the first data with the second data.

15. A method according to claim 13, further comprising the step of discriminating an abnormality based on a plurality of diagnosing results from said diagnosing step.

16. A method according to claim 15, further comprising the step of notifying of the abnormality discriminated in said step of discriminating an abnormality.

17. An abnormality diagnosis method of a communication system for communication with a plurality of communication control that are cascade-connected with a signal line, said method comprising the steps of:

storing arrangement information of the plurality of communication control units that are cascade connected;

designating a peculiar address with respect to each of the plurality of communication control units;

diagnosing an abnormality in communication with each of the plurality of communication control units by sending and receiving test data by sequentially performing abnormality diagnosis of the plurality of communication control units in a diagnosing order based on designation information from said designating step and the stored arrangement information;

discriminating an abnormal portion of the signal line, based on a result from said diagnosing step; and providing a notification of the abnormal portion discriminated in said discriminating step.

18. A method according to claim 17, wherein said diagnosing step comprises:

a transmitting step of transmitting first data to a communication control unit;

a receiving step of receiving second data from the communication control unit; and a comparing step of comparing the first data with the second data.

19. A method according to claim 17, further comprising the step of discriminating an abnormality based on a plurality of diagnosing results from said diagnosing step.

20. A method according to claim 19, further comprising the step of notifying of the abnormality discriminated in said step of discriminating an abnormality.

\* \* \* \* \*

UNITED STATES PATENT AND TRADEMARK OFFICE
CERTIFICATE OF CORRECTION

PATENT NO. : 6,134,604
DATED : October 17, 2000
INVENTOR(S) : Takashi Soya et al.

It is certified that error appears in the above-identified patent and that said Letters Patent is hereby corrected as shown below:

Abstract,
Line 20, "correspond" should read -- to correspond --.

Sheet 1,
Figure 1, "MOTER" should read -- MOTOR --.

Sheet 3,
Figure 4, "MOTER" should read -- MOTOR --.

Sheet 5,
Figure 6, "TRAMSMIT" should read -- TRANSMIT --; and "ADDRESS" should read -- ADDRESSES --.

Figure 8:
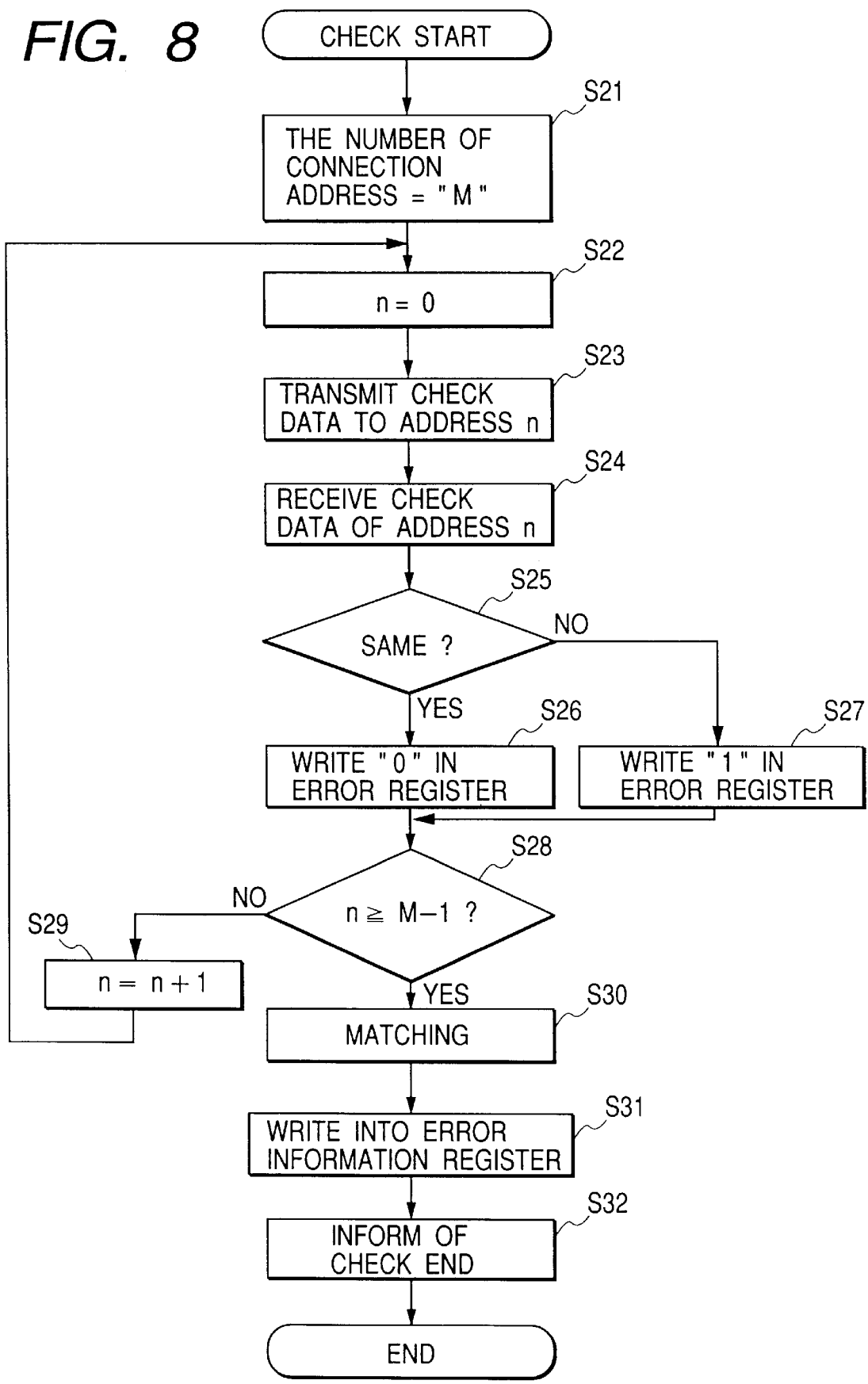
FIG. 8 is a flowchart showing the second embodiment of an abnormality diagnosing method of the invention.

Sheet 7,
Figure 8, "ADDRESS" should read -- ADDRESSES --.

Figure 9:
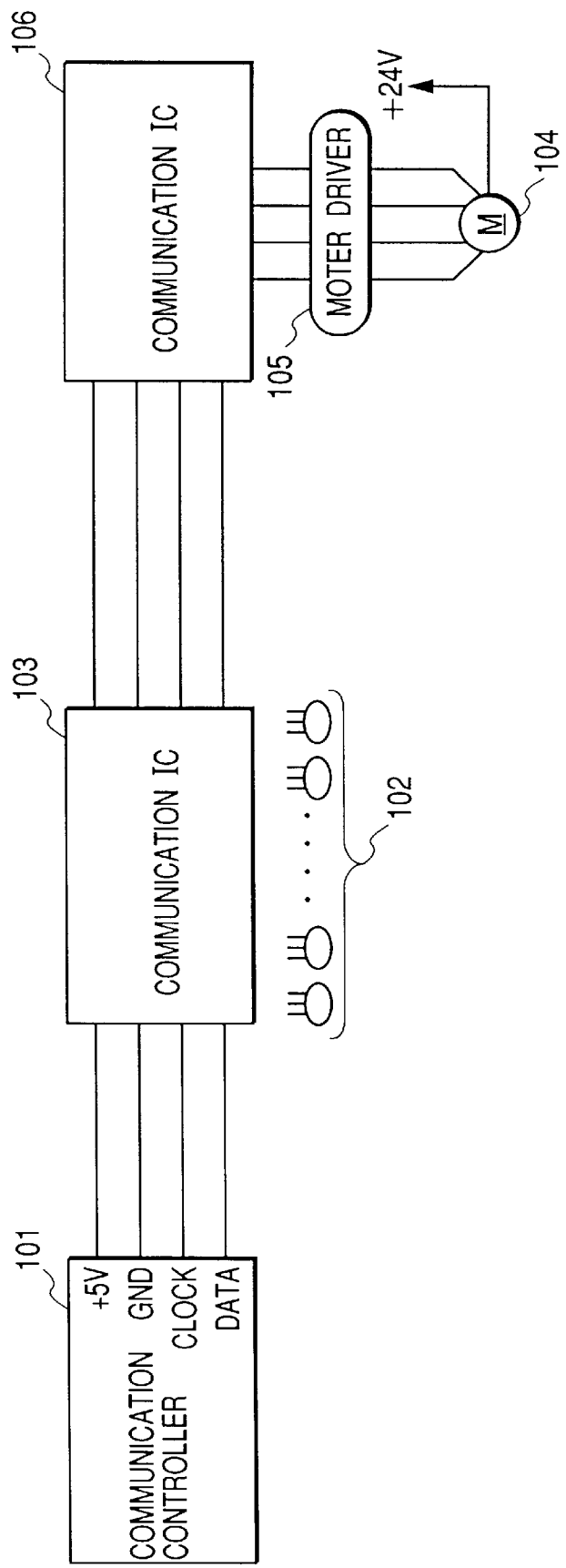
FIG. 9 is a system constructional diagram showing a construction of a general serial communication system.
Figure 10:
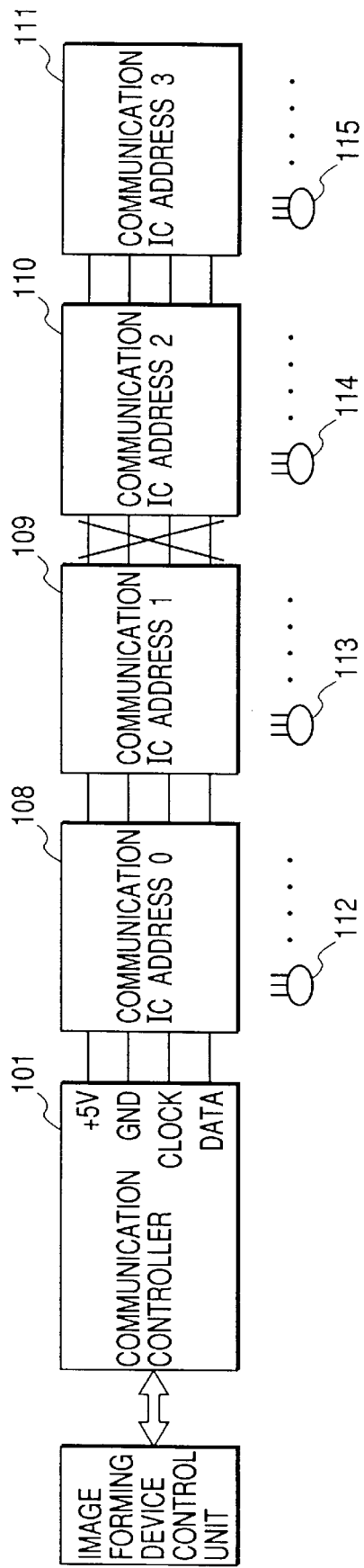
FIG. 10 is a system constructional diagram showing the first example when there is a partial disconnection in the case where a plurality of communication ICs are connected to the communication controller.

Sheet 8,
Figure 9, "MOTER" should read -- MOTOR --.

Figure 11:
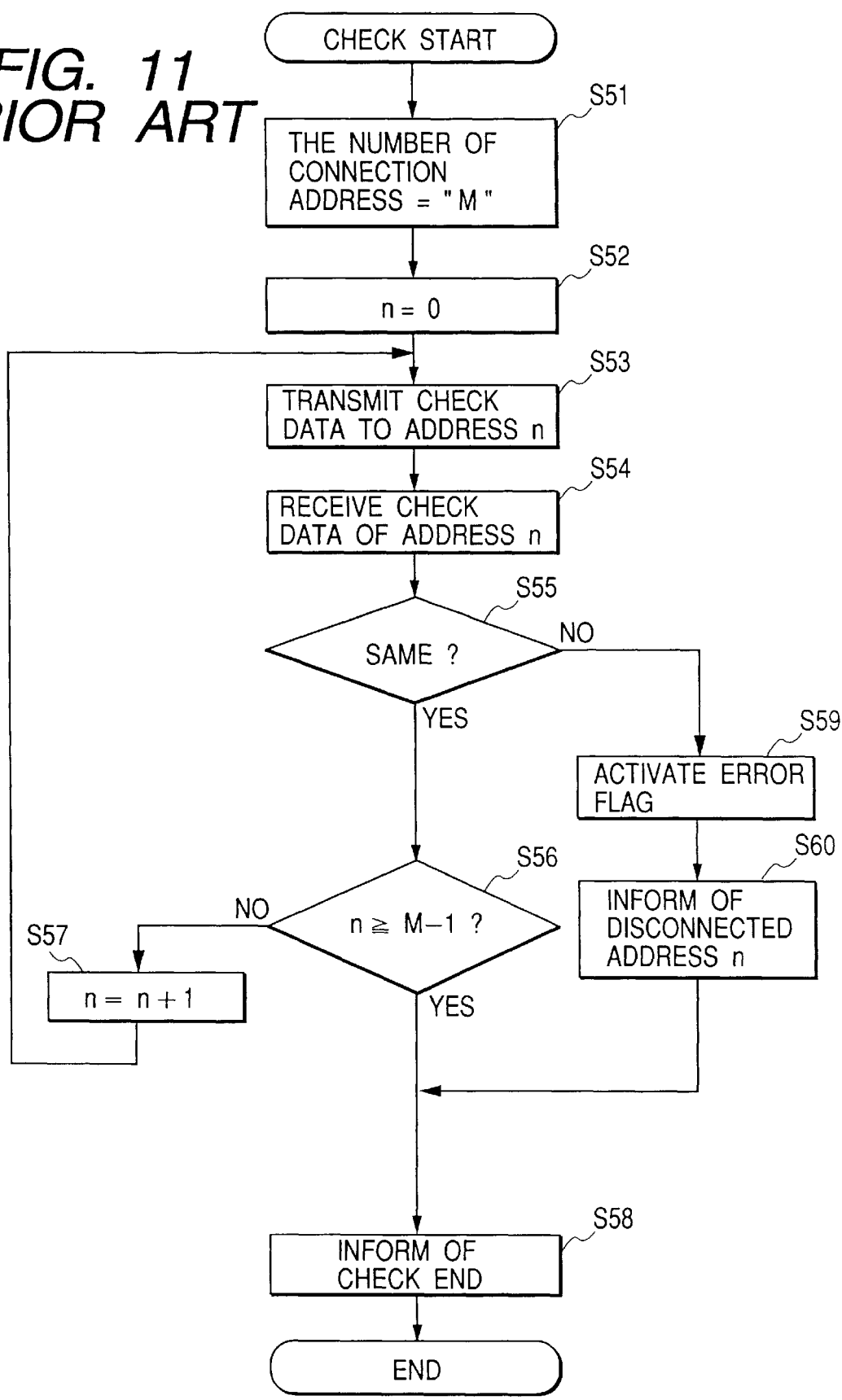
FIG. 11 is a flowchart showing a conventional example of an abnormality diagnosing method.
Figure 12:
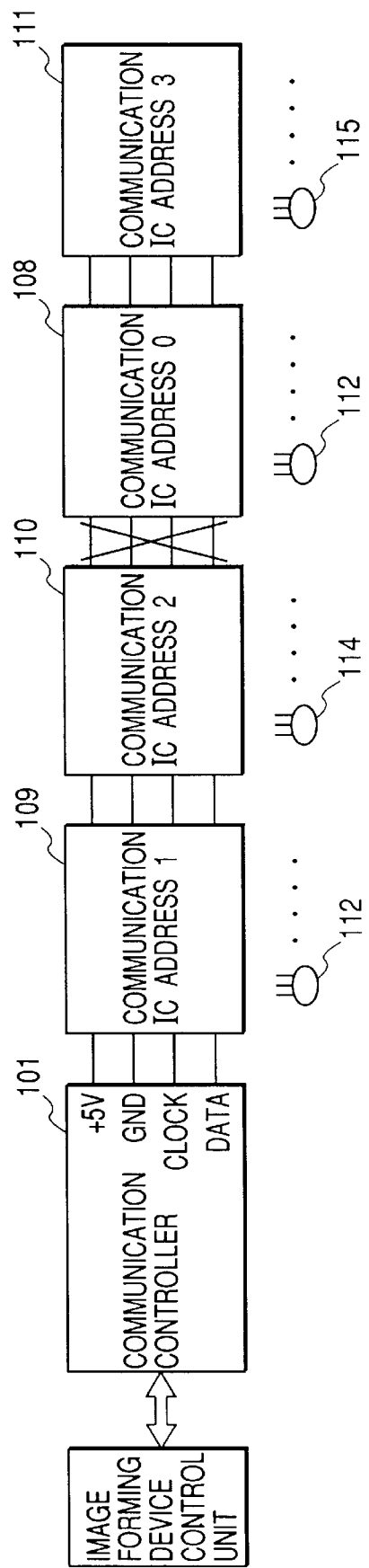
FIG. 12 is a system constructional diagram showing the second example when there is a partial disconnection in the case where a plurality of communication ICs are connected to the communication controller.

Sheet 10,
Figure 11, "ADDRESS" should read -- ADDRESSES --.

Column 5,
Line 45, "stores" should read -- stores it --.

Column 7,
Line 19, "S1" should read -- S60 --.

Column 9,
Line 34, "Plurality" should read -- plurality --.

UNITED STATES PATENT AND TRADEMARK OFFICE
CERTIFICATE OF CORRECTION

PATENT NO. : 6,134,604
DATED : October 17, 2000
INVENTOR(S) : Takashi Soya et al.

It is certified that error appears in the above-identified patent and that said Letters Patent is hereby corrected as shown below:

<u>Column 10,</u>
Line 31, "control" should read -- control units --.
Line 44, "step;" should read -- step; and --.
Line 63, "control" should read -- control units --.

Signed and Sealed this

Thirteenth Day of November, 2001

*Attest:*

NICHOLAS P. GODICI
*Attesting Officer*    *Acting Director of the United States Patent and Trademark Office*